United States Patent [19]
Andersen

[11] Patent Number: 6,016,643
[45] Date of Patent: Jan. 25, 2000

[54] WEIGHT CONTROLLED PRODUCE FILLING SYSTEM

[75] Inventor: Michael A. Andersen, Othello, Wash.

[73] Assignee: Flodin, Inc., Moses Lake, Wash.

[21] Appl. No.: 09/136,135

[22] Filed: Aug. 8, 1998

[51] Int. Cl.[7] .................................................. B65B 1/32
[52] U.S. Cl. .............................................. 53/502; 53/244
[58] Field of Search ........................... 53/502, 244, 570, 53/493; 141/83; 177/17, 25.19

[56] References Cited

U.S. PATENT DOCUMENTS

| | | |
|---|---|---|
| 3,912,072 | 10/1975 | Kornylak . |
| 4,730,719 | 3/1988 | Brown et al. ........................... 198/387 |
| 5,040,667 | 8/1991 | Kamita . |
| 5,159,796 | 11/1992 | Tas . |
| 5,181,596 | 1/1993 | Warkentin . |
| 5,325,653 | 7/1994 | Boyd . |
| 5,345,748 | 9/1994 | Powell, Jr. ............................... 53/244 |
| 5,651,446 | 7/1997 | Affeldt et al. . |

*Primary Examiner*—John Sipos
*Assistant Examiner*—Steven Jensen
*Attorney, Agent, or Firm*—Robert L. Shaver

[57] ABSTRACT

A device for transporting fruit or produce on an endless chain to a produce container. The produce container is continually weighed, and as it fills with produce and reaches a warning weight, a motor which drives an endless chain slows to a lower speed. When the weight of the produce container and produce exceeds a target weight after the addition of one piece of produce or fruit, a weight comparison means signals the motor to stop. The produce container is released and removed from the device, and new empty one is placed in the device. This allows the produce container to be filled above a target weight by the addition of no more than one piece of fruit or produce.

7 Claims, 6 Drawing Sheets

WEIGHT CONTROLLED PRODUCE FILLING SYSTEM

BACKGROUND OF THE INVENTION

1. Field of the Invention

The present invention generally relates to endless chain or belt conveyor systems for filling containers, and more specifically to filling systems for achieving a desired weight in a container by the addition of one article.

2. Background Information

Product handling for agricultural products often involves moving the products from a bulk bin or tote into smaller containers. This is achieved in a variety of ways, many of which use endless belts or endless conveyor chains. Some of these devices move the container as it fills to control the distance that fruit or produce drops into the container. Some move the container around so that fruit or produce going into a box is filled one layer at a time in discreet sections. For situations in which fruit or produce is filled into a bag or box, and the container must be over a certain weight, various systems or devices are used to achieve this weight. One device weighs potential additions to the container, and as the container nears its target fill weight, selects from the potential additions to the container, and chooses the fruit or vegetable whose addition will make the container exceed its minimum, by the least amount possible. This system is complicated and expensive, and is not typically used in produce bagging and weighing.

Other transporting, weighing and filling systems utilize a system of two belts which operate at different speeds. Fruit or produce is conveyed on both belts into the container. One of these belts or chain conveyors may operate at a different speed than the other, or they may both operate at the same speed. When the target weight is reached or when a warning weight is reached, one of the belts is stopped, usually the faster and more high-volume belt, and the other belt continues to feed fruit or produce, usually at a slower rate, into the container. As fruit or produce drops from the slower belt into the container, the container plus the fruit is continually weighed, and when a target weight is exceeded, the second belt stops. At that point the container is full, and is replaced by an empty container to be filled by the two belts.

The disadvantage of this system just described is that it requires two belts, each with a separate motor and speed controller, for operation. A simpler system would utilize one belt per container, so that more containers could be filled with the same amount of equipment.

Other systems block the flow of fruit or produce when a target weight is reached. The blockage may cause a buildup of articles, which when released can cause a dump of articles into the bag being filled.

Accordingly, it is an object of the invention to fill a container by a filling and weighing system, which can cease filling the container when a target weight is exceeded by the addition of one article of produce or fruit.

It is a further object of the invention to utilize one endless belt or chain per container to be filled, and to utilize one motor per endless belt or chain per container to be filled, and to utilize one motor per endless belt or chain.

Another object of the invention is to provide an endless chain which causes food or produce to form into a single file before they are added to a container.

It is a further object of the invention to combine a weighing system with a bag filling system. It is a further object of the invention to provide a filling and weighing system which utilizes multiple endless chains or belts, so that changing a container on one does not halt the flow of articles through the system.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These and other objects are accomplished by a device which provides for weight controlled filling of one or more produce containers with articles of produce or fruit. The invention includes one or more endless chains which move produce or fruit at a rate which is selectable by the user or by programming pre-selected by the user. The endless chains or belts move fruit or produce from a feed area to one or more produce containers. The endless chain or belt contains paired conical or frusto conical rollers on the endless chain. These paired conical or frusto conical rollers (hereinafter called conical rollers) form the fruit or produce into a single file, and stabilize the articles of produce or fruit so that they do not fall off the side of the chain. One or more motors are included, which moves each of the endless chains and fruit or produce on the endless chains from the feed area to one or more produce containers. A motor speed controller is also included for controlling and varying the motor speed. A produce container holder is provided for each endless chain, which is associated with a produce container, and holds the produce container in place while it is being filled with produce or fruit.

Also included is a weighing device which allows for continual weighing of the produce container as it fills with produce. The weight of the produce container and the produce is compared with a stored value of a warning weight, by use of a means of comparison. When the container and the fruit it contains equals or exceeds the pre-set warning weight, a signal is sent to the motor speed controller. The signal sent to the motor speed controller causes the motor speed controller to slow the rate of travel of the endless chain to a speed that allows the weighing device to discriminate additional weight changes caused by the addition of individual articles of fruit or produce. When the weighing device detects that the produce container and the produce or fruit it contains exceeds the weight of a pre-set target weight, the comparison means sends a signal to the motor speed controller which causes the motor speed controller to stop the endless chain. At that time, the produce container holder is released, and the full produce container, which exceeds the target weight by no more than the weight of one piece of fruit or produce, is then available for removal from the device, after which a new and empty produce container can be placed in the produce container holder.

One version of the device contains four endless chains, which diverge from each other beginning in the feed area, and diverging from each other towards the produce container. Each chain has its own motor and speed controller. Typically, the motor would be operated in two speeds with a stop position, which would be selected by the motor speed controller. One version of the device can include a produce container which is generally circular in cross-section, and whose walls define an aperture through which an end of the endless chain protrudes, and through which produce is carried by the endless chain.

The container holder of the invention is a manually operated device which includes a lever activated by hand, which mechanically activates clamps which grip the container and hold it against the walls of the container holder. This manually operated produce container holder includes a release and lock handle, a pair of side rollers, and a pair of container clamps.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

DESCRIPTION OF THE PREFERRED EMBODIMENTS

Figure 1:
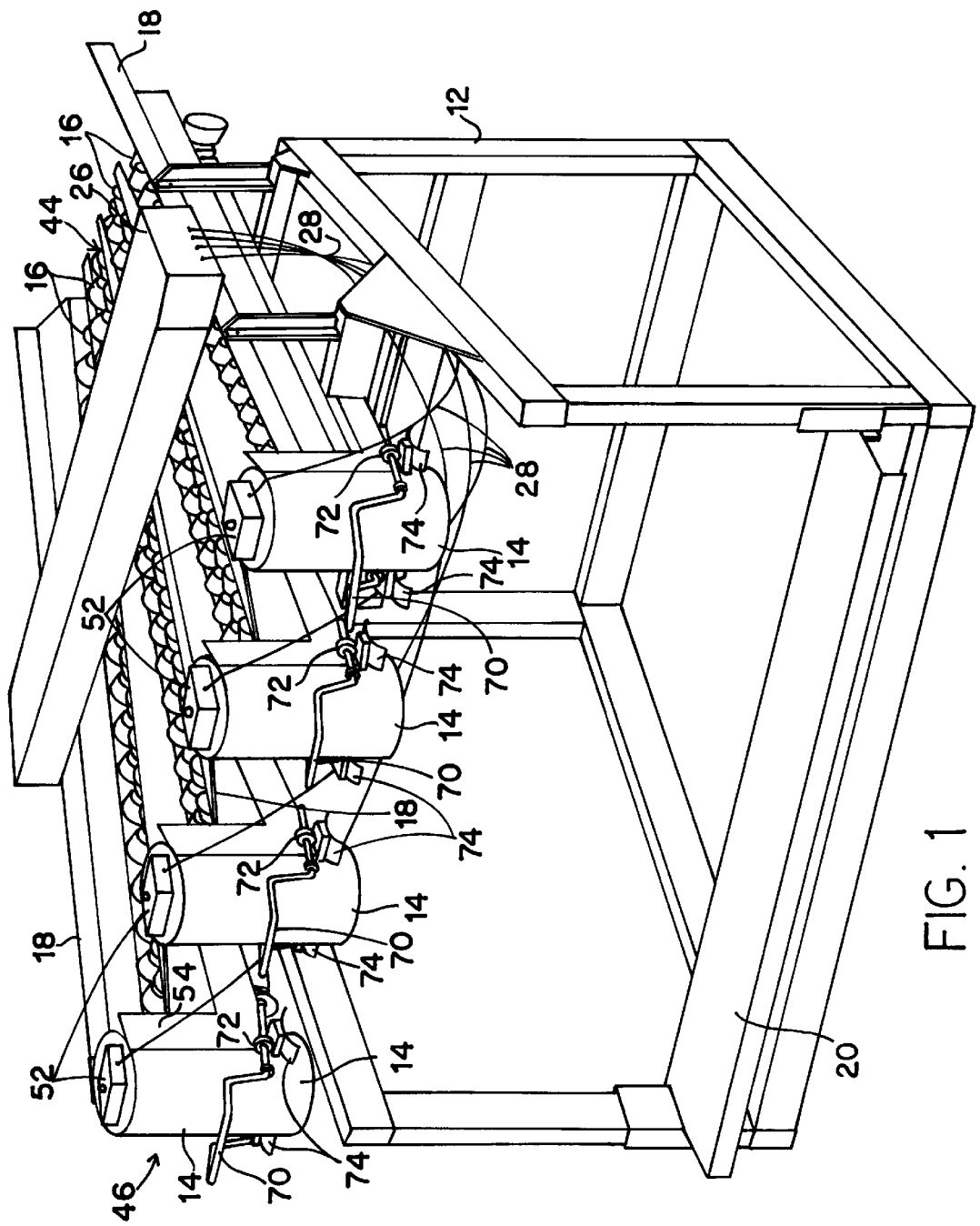
FIG. 1 is a perspective view of the weight controlled filling system.
Figure 2:
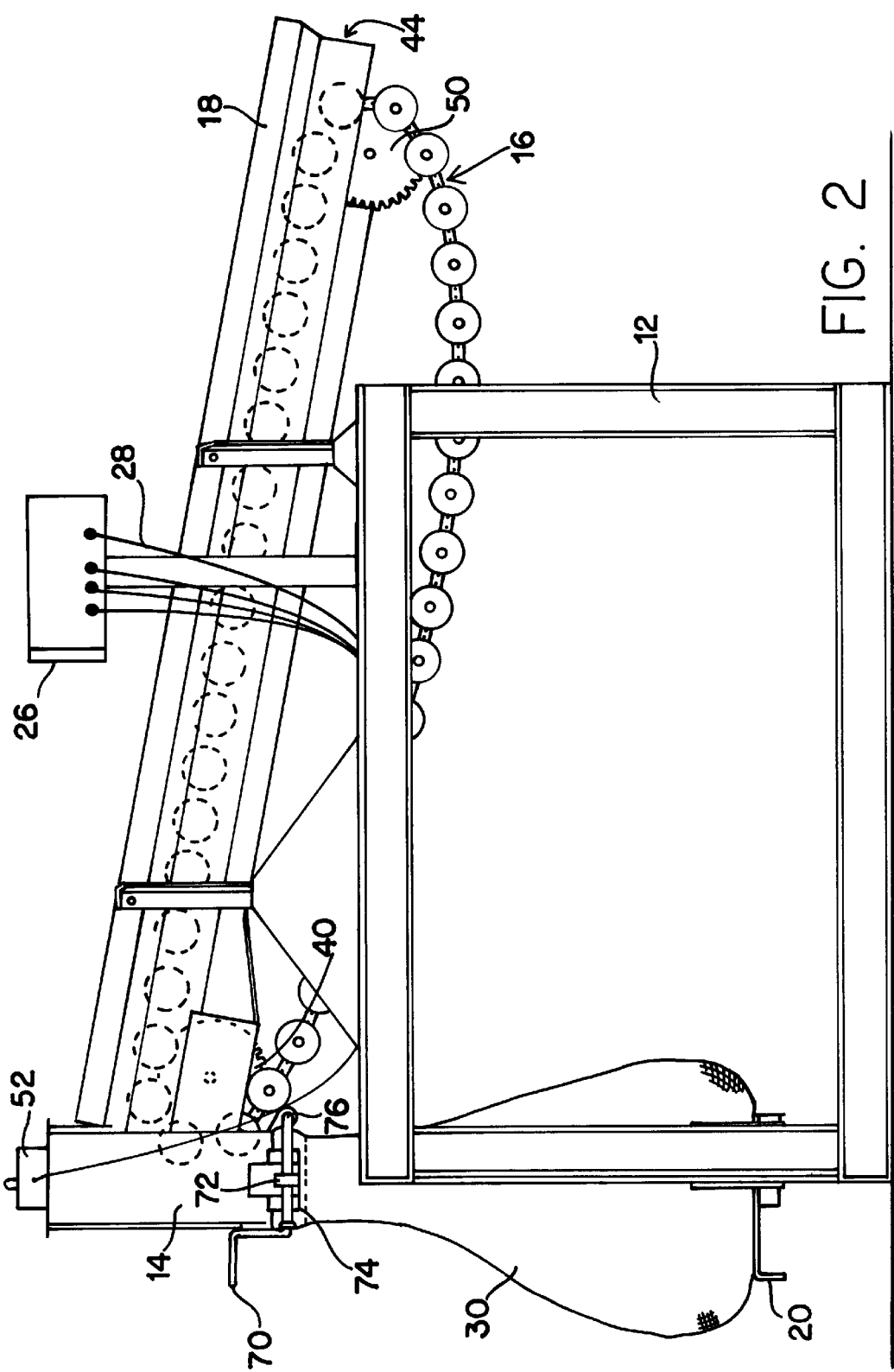
FIG. 2 is a side view of a weight controlled filling system.

The preferred embodiment of the invention is shown in FIGS. 1 through 6. Referring to FIG. 1, the weight controlled filling system includes a steel frame 12 and four endless chains 16, which are in close proximity to one another at a feed end 44, and which diverge from each other at the fill end 46. Associated with each endless chain 16 is a cylindrical weighing head 14, each of which includes an aperture 48, through which the fill end 46 of the endless chain 16 partially extends. The endless chain 16 is supported by a drive gear 40 at the fill end 46 and an idler gear 50 at the feed end 44. Weighing head 14 is attached to a load cell 52, and except for its connection to load cell 52, weighing heads 14 are able to move up and down on bearings which slide along guide plates 54. Load cells 52 are connected by signal wires 28 to a computer 26. Computer 26 is mounted to frame 12, and is located above endless chains 16, as shown in FIG. 1.

Within computer 26 is included a means such as a keypad or menu selection buttons, of entering a warning weight, and a target weight. In the preferred embodiment, the means of entering a warning weight and a target weight is by a digital display with selection keys. Also included within the computer 26 is a means for comparing the weight of a container and the produce within the container to the warning weight and to the target weight. Also included within the computer is a means for converting a signal from the load cell 52 into a weight value, for comparison with a stored warning weight and a stored target weight. A number of off the shelf computers could be utilized with the invention, but in the preferred embodiment a Motortronics solid state motor controller is used, with an INFCS strain guage, Infinity model, to enter the warning and target weights.

Associated with each endless chain 16 is a motor 38. Although any number of motor configurations could work, a one-half horsepower motor with a hollow shaft gear reducer and a drive sprocket with bearings is utilized in the preferred embodiment. Associated with each motor 38 is a speed controller (not shown), which is itself connected to computer 26 by a signal wire 28. In the preferred embodiment, the speed controller is an AC inverter.

Figure 5:
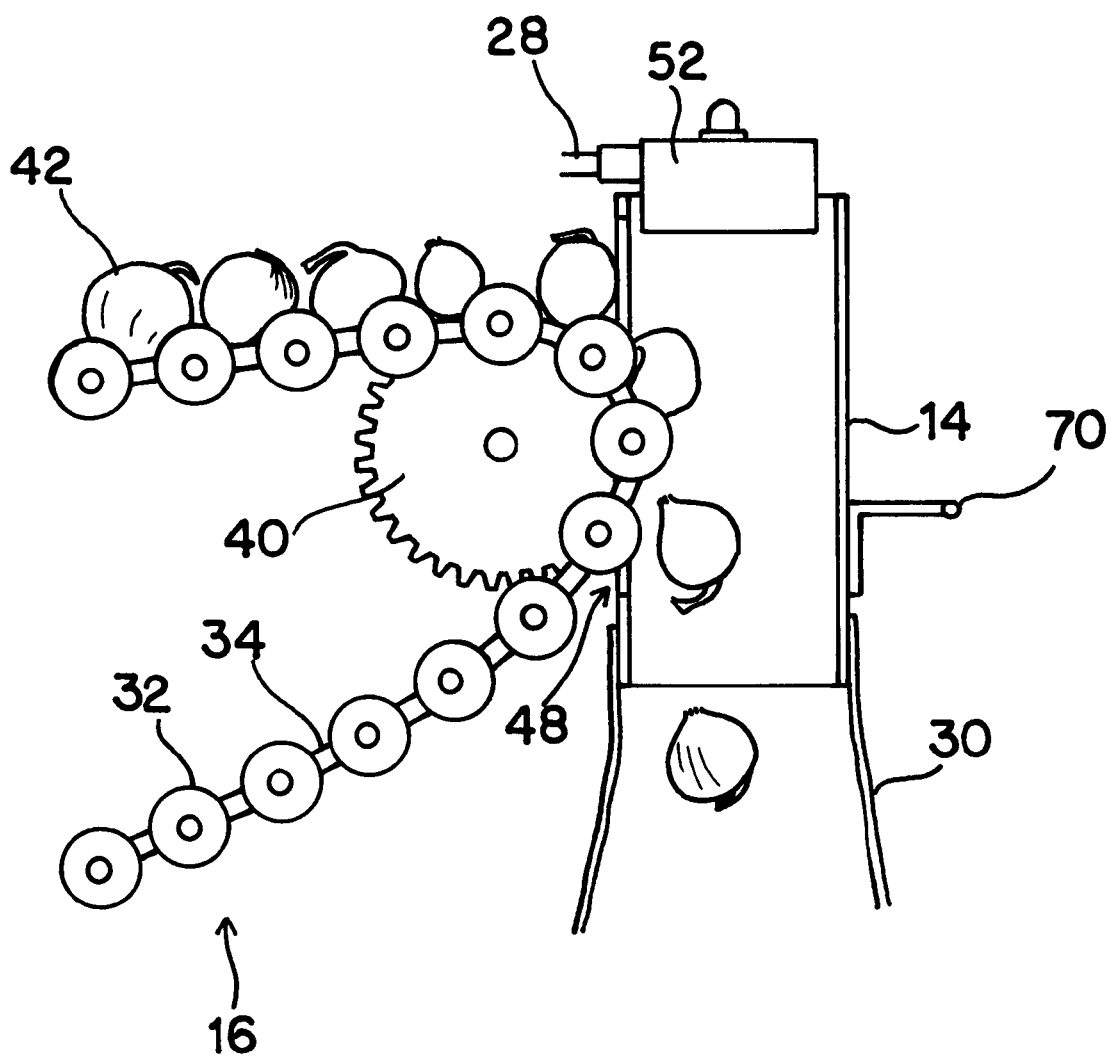
FIG. 5 is a side partly cross-sectional view of a bag holder, weigher and an end of an endless chain.
Figure 6:
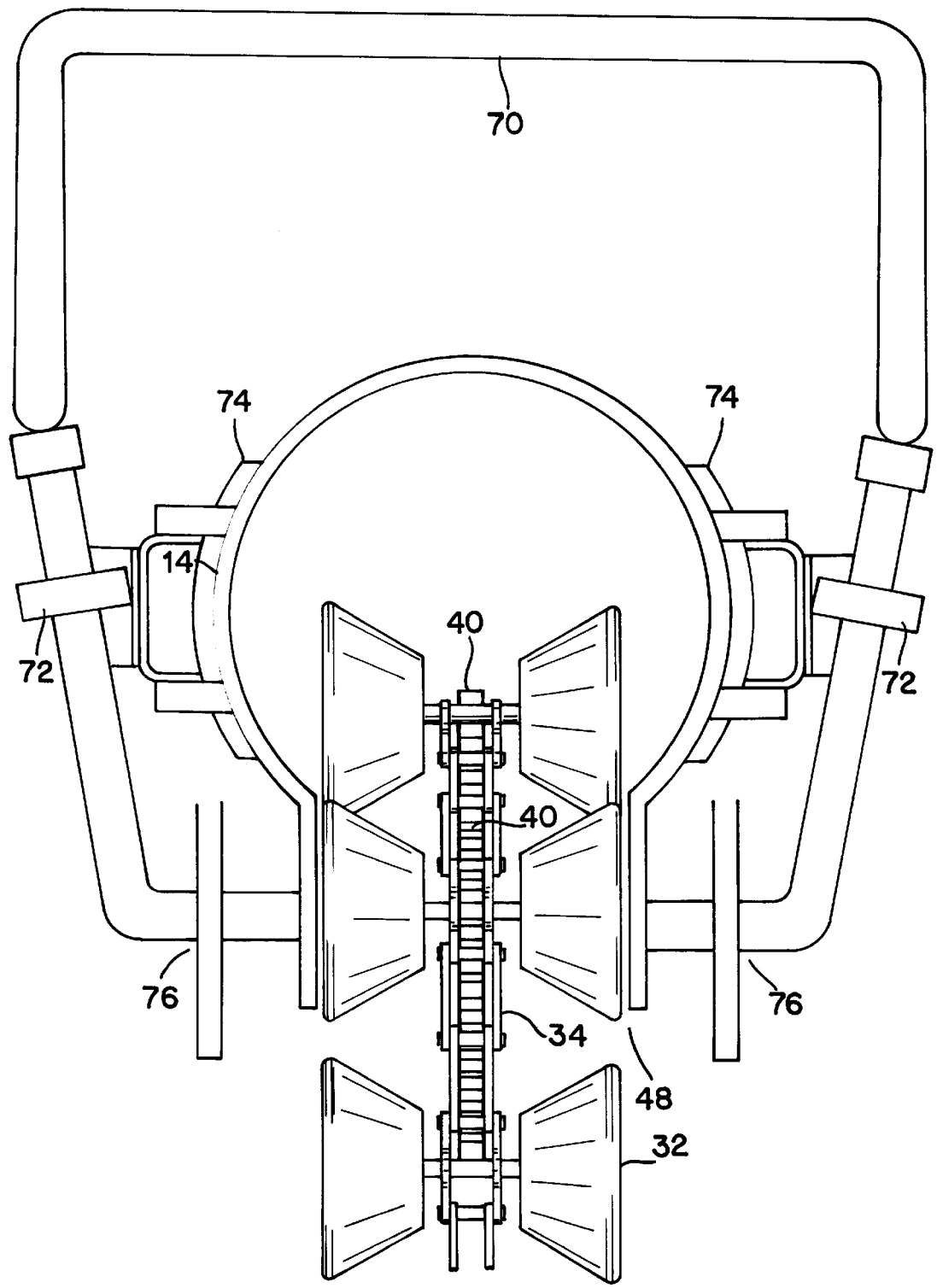
FIG. 6 is a top view of an endless chain as it enters a weigher.

The device 10 also includes a produce container holder 58. The produce container holder includes a lock and release handle 70, bag clamps 74, and rollers 72. The produce container holder is best seen in FIGS. 5 and 6.

Figure 3:
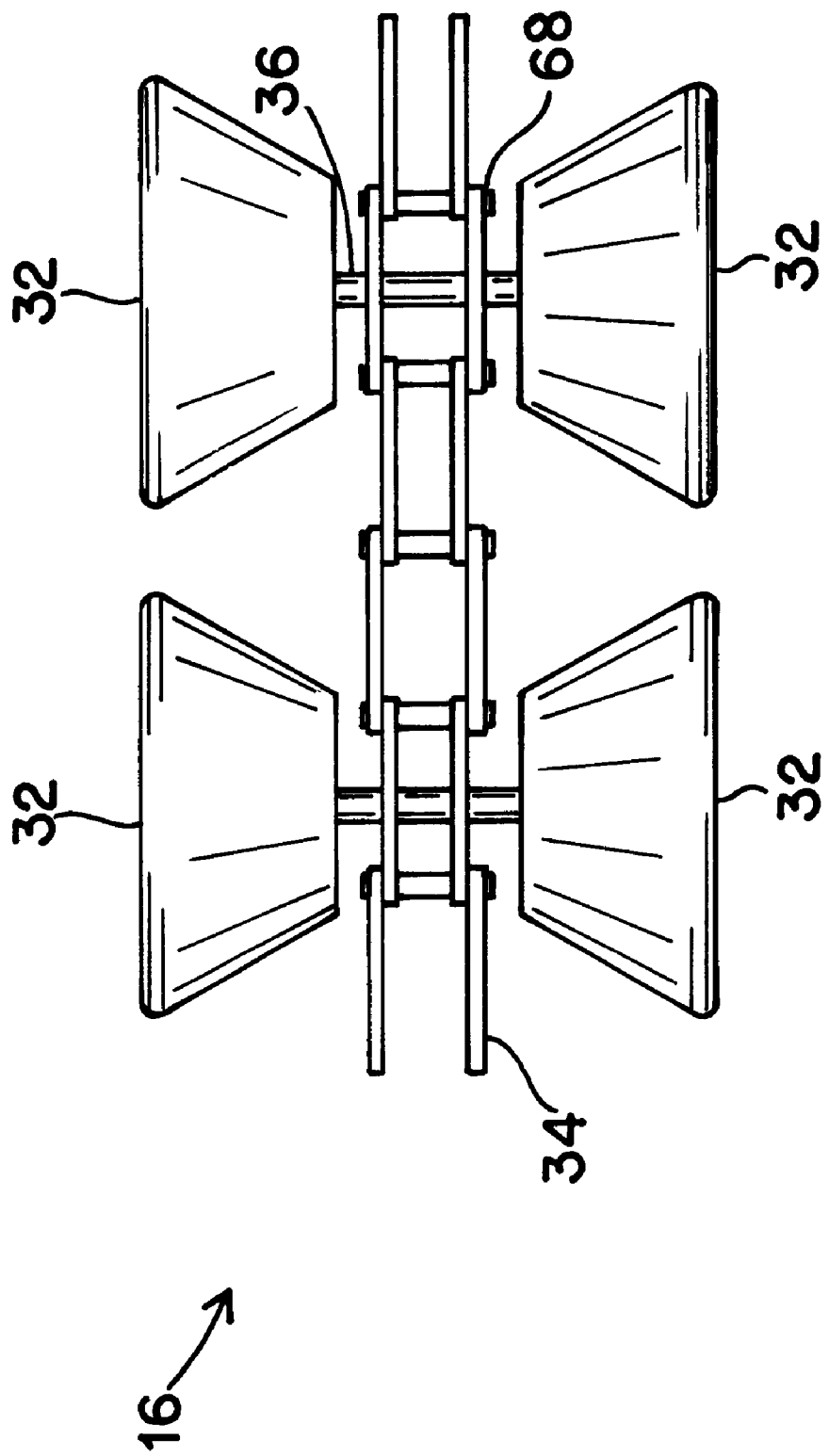
FIG. 3 is a top view of links in an endless chain and the frusto conical rollers of the chain.
Figure 4:
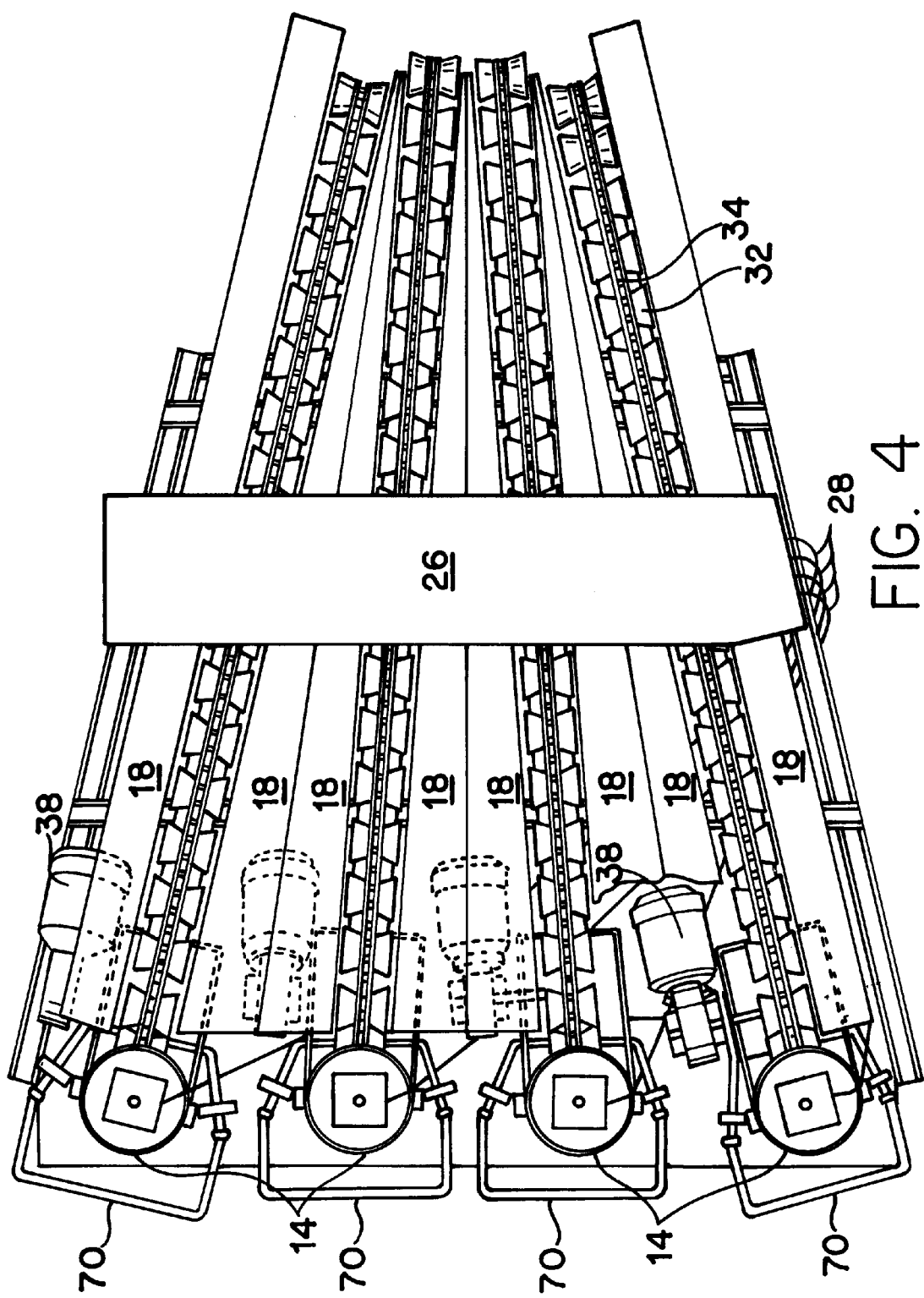
FIG. 4 is a top view showing four diverging endless chains and their associated weighers.

Endless chain 16 can be formed from belting material, or from individual links which are joined together to make a chain. In the preferred embodiment, the endless chain 16 is composed of links 34, which are connected to each other by pins 68 as shown in FIG. 3. The assembled chain is approximately 14 feet in length. Interspersed among the links are conical or frusto conical rollers 32. In the preferred embodiment, these rollers 32 are frusto-conical, and are mounted to a roller axle 36, which extends through the links 34 of the endless chain 16. The preferred configuration uses rollers which have an outside diameter of 3 ½ inches on the larger side of the cone, and about 2 inches on the smaller side of the cone, and are about 2 inches in width. The rollers are on 4 ½ inch centers. The chain is an RC2060 roller chain with holes in the links for the axles for the rollers.

In operation, the weight controlled produce filling system works by being associated with a bulk produce feed area (not shown). Produce from the bulk produce feed area is carried by endless chains 16 between rollers 32 in single file toward fill end 46 of the four diverging endless chains 16. At the fill end 46, the endless chains 16 pass through aperture 48 and move over drive gear 40. As the links 34 of endless chain 16 pass over the drive gear 40, articles of produce of fruit drop off the end of the endless belt 16.

A produce container 30, typically of plastic mesh, is placed on the weighing head 14, held in place by the produce container holder. As each article of produce drops into container 30, weighing head exerts an increasing amount of strain on load cell 52. This strain is kept horizontal by guide plates 54 on each weighing head 14, along which each weighing head 14 can slide using bearings. Load cell 52 generates a signal based on the strain exerted on it by the weighing head 14, which slides freely on bearings. The signal from load cell 52 is sent to computer 26, converted to a weight value, and the weight value is compared with a preentered warning weight and a target weight. When the weight of the container 30 and produce 42 exceeds the warning weight, the computer sends a signal to the motor speed controller, which causes the motor to slow down. At a slower speed, produce 42 continues to drop into the container 30, and the load cell continues to send a signal to the computer. When the weight of the container 30 and the produce 42 exceeds the target weight due to the addition of one article of produce, the computer signals the motor speed controller to stop. At that time, the produce container holder can be released, the full container can be removed from shelf 20, and a new and empty container can be attached to the weighing head 14 and the produce container holder, to being a new cycle of filling and weighing.

While there is shown and described the present preferred embodiment of the invention, it is to be distinctly understood that this invention is not limited thereto but may be variously embodied to practice within the scope of the following claims.

I claim:

1. A device for weight controlled filling of one or more containers with units of produce which comprises:

a speed controllable endless chain or belt for transporting and singulating units of produce, for forming units of produce into single file;

one or more motors for controlling said endless chain or belt:

a container for receiving said units of produce;

a container holder which is operationally connected to a weighing device;

a weighing device which continually measures weight of produce units in said produce container; and a comparison means for relating a weight of said produce container and produce within it with a target weight, and in response to a produce container filled to a weight greater than the target weight by the addition of no more than one unit of produce delivered in said single file to said produce container by said endless chain or belt, stopping said endless chain or belt so that a produce container is changed for an empty produce container when the target weight is reached.

2. A device for weight controlled filling one or more produce containers with produce which comprises:

one or more endless chains for moving produce at a selectable rate of travel from a feed area to one or more produce containers;

paired frusto conical rollers on said endless chains for forming said produce into single file on said endless chain;

one or more motors for moving each of said endless chains;

one or more motor speed controllers for controlling motor speed;

a produce container holder for each said endless chain, which is attached to a produce container and into which produce is deposited by said endless chain;

a weighing device for continual weighing of said produce container as produce is deposited in said produce container;

a comparison means for relating a weight of said produce container and produce within it with a warning weight and a target weight of a filled produce container, and for sending a signal to said motor speed controller; wherein said comparison means sends a signal to said motor speed controller which causes said motor speed controller to slow said rate of travel of said endless chain to a speed such that a weight difference caused by deposition in said produce container of a subsequent individual produce piece is detectable, so that said motor speed controller has sufficient time to react to said weight difference of an individual produce piece to stop said endless chain when said weight of said produce container exceeds said weight of said target weight.

3. The device of claim 2 which further comprises four diverging endless chains.

4. The device of claim 2 in which said one or more motor speed controllers has two speeds and a stop position.

5. The device of claim 2 in which said produce container holder include walls which define an aperture through which said endless chain protrudes and through which said produce is carried by said endless chain.

6. The device of claim 2 in which said produce container holder is a manually operated device which further comprises a release/lock handle attached to said produce container holder, one or more lever arms which are attached to said release/lock handle and which are activated to release or lock said release/lock handle, and one or more container grippers, which are attached to said release/lock handle and which press said produce container against said container holder, thereby temporarily attaching said produce container to said produce container holder.

7. A device for weight controlled filling of multiple produce containers with produce which comprises:

multiple diverging endless chains for moving produce at a selectable rate of travel from a feed area to a plurality of produce containers;

paired frusto conical rollers on said chains for forming said produce into single file on each of said endless chains;

a plurality of motors for moving each of said endless chains;

a plurality of motor speed controllers for controlling motor speed;

a produce container holder for each of said endless chains, which is attached to a produce container and into which produce is deposited by said endless chain;

a weighing device associated with each container holder, for continual weighing of said produce container as produce is deposited in said produce container;

one or more comparison means for relating a weight of a produce container and produce within it with a warning weight and a target weight of a filled produce container, and for sending a signal to said motor speed controller associated with said produce holder; wherein said comparison means sends a signal to said motor speed controller which causes said motor speed controller to slow said rate of travel of said endless chain to a speed such that a weight difference caused by a subsequent individual produce piece is detectable, so that said motor speed controller has sufficient time to react to said weight difference of an individual produce piece to stop said endless chain when said weight of said produce container exceeds said weight of said target weight.

* * * * *